United States Patent [19]
Cook

[11] 3,761,835
[45] Sept. 25, 1973

[54] AUTOMATIC FREQUENCY CONTROL SYSTEM

[75] Inventor: John Michael William Cook, East Grinstead, England

[73] Assignee: U.S. Philips Corporation, New York, N.Y.

[22] Filed: Oct. 14, 1971

[21] Appl. No.: 189,210

[30] Foreign Application Priority Data

Oct. 19, 1970 Great Britain .................. 49,471/70

[52] U.S. Cl. .................................... 331/1 A, 331/9
[51] Int. Cl. ............................................ H03b 3/04
[58] Field of Search ................................ 331/1 A, 9

[56] References Cited

UNITED STATES PATENTS

| | | | |
|---|---|---|---|
| 3,185,938 | 5/1965 | Pelosi | 331/1 A |
| 3,259,851 | 7/1966 | Brauer | 331/1 A |
| 3,370,252 | 2/1968 | Zoerner | 331/1 A |
| 3,395,361 | 7/1968 | Brauer | 331/1 A |
| 3,484,712 | 12/1969 | Foote et al. | 331/1 A |
| 3,514,698 | 5/1970 | Rey | 331/1 A |
| 3,555,446 | 1/1971 | Braymer | 331/1 A |
| 3,644,840 | 2/1972 | Conner | 331/1 A |
| 3,651,422 | 3/1972 | Underhill | 331/1 A |

*Primary Examiner*—John Kominski
*Attorney*—Frank R. Trifari

[57] ABSTRACT

The present invention relates to an automatic frequency control (AFC) system for controlling the frequency of an oscillator.

5 Claims, 2 Drawing Figures

AUTOMATIC FREQUENCY CONTROL SYSTEM

Such systems are known in which analogue techniques are used to lock the frequency of a local, voltage-controlled, oscillator with the frequency of a reference signal by means of an AFC loop in which the frequency of the local oscillator is compared with the reference frequency and a difference signal derived therefrom. The difference signal is then integrated, for example in a low pass filter, to produce a voltage proportional to the average value of the difference signal. This voltage then controls the local oscillator frequency in such a direction as to reduce the difference signal.

It is known that digital techniques offer several advantages over comparable analogue techniques, particularly where integrated circuits are used. The object of the present invention is the provision of an AFC system using digital techniques.

According to the present invention there is provided an AFC system for controlling the frequency of a voltage-controlled oscillator wherein a binary digital number representative of the required frequency of the oscillator is compared at intervals with a binary digital number representative of the actual frequency of the ocillator, and wherein the successive differences between the two numbers obtained from the comparisons thereof are added in a digital accumulating adder the digital output of which is converted to an analogue voltage for controlling the frequency of the said oscillator.

Figure 1:
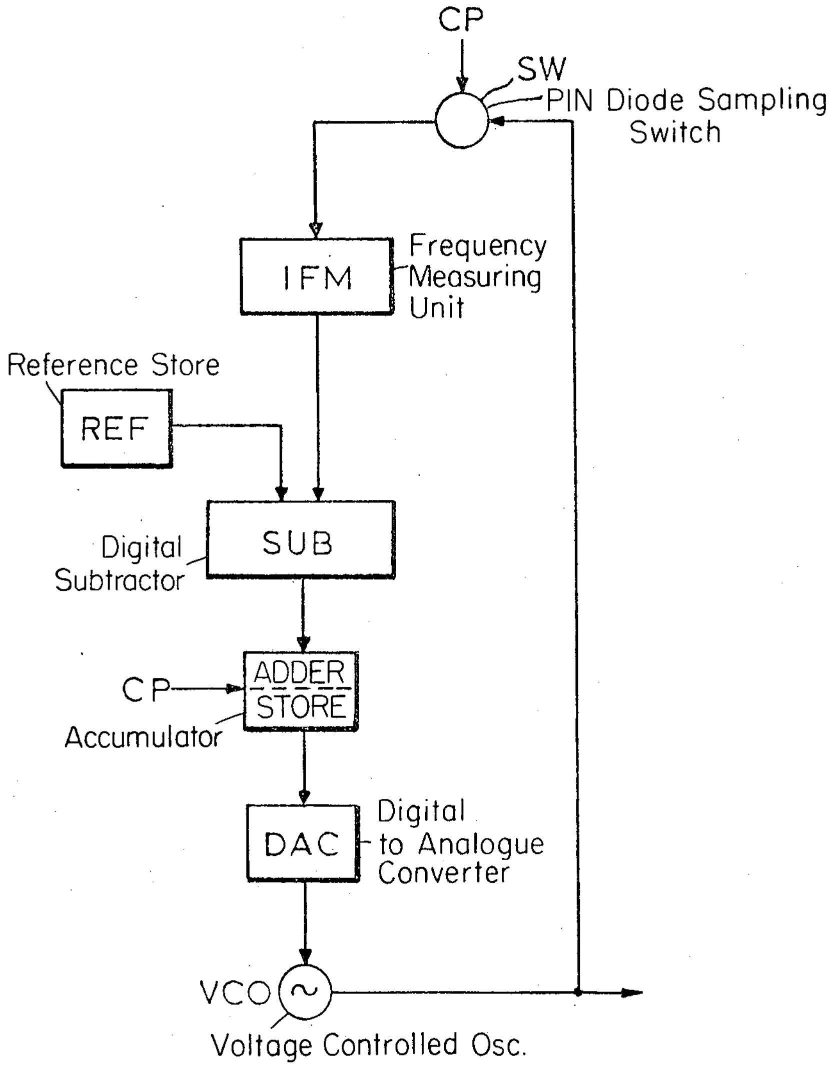
Figure 2:
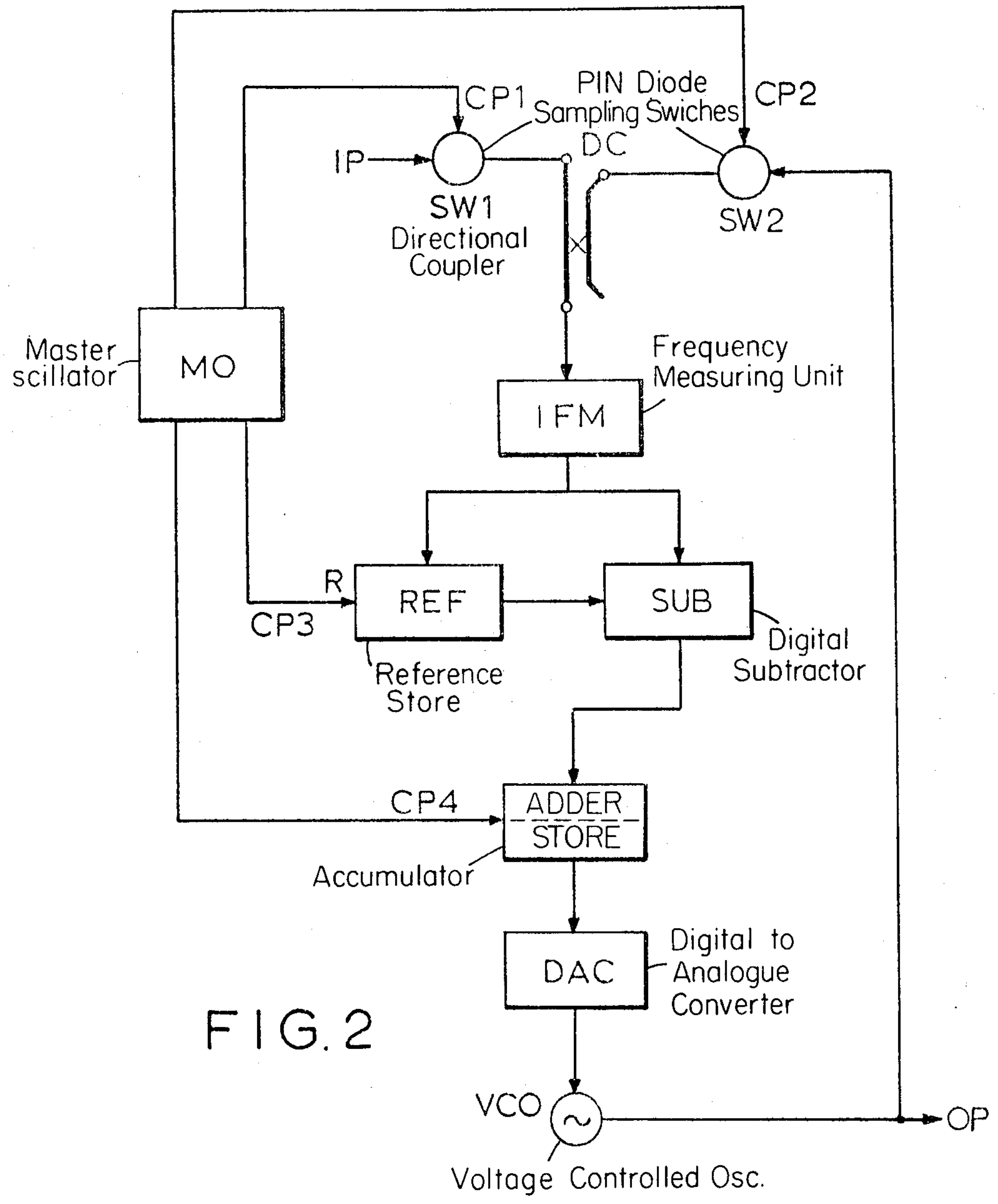

The various features and advantages of the present invention will be apparent from the following description of exemplary embodiments thereof taken in conjunction with the accompanying drawings, in which:

FIG. 1 shows an explanatory block schematic diagram of an AFC system in accordance with the invention, and FIG. 2 shows such a system for use in conjunction with a reference signal at microwave frequencies.

Referring now to FIG. 1, an AFC loop comprises, in order of signal passage, a voltage-controlled oscillator VCO, a sampling switch SW, a frequency measuring unit IFM which has a digital output, a digital subtractor SUB, an accumulating adder ACC comprising an adder and a store, and a digital-to-analogue converter DAC. A reference store REF, which contains a digital number representative of the required frequency of the oscillator, is connected to a further input of subtractor SUB. Switch SW and accumulator ACC are controlled by clock pulses CP.

The operation of the AFC system is as follows. The frequency of oscillator VCO is sampled at regular intervals by the sampling switch SW under the control of clock pulses arriving at the CP input and fed to the input of frequency measuring unit IFM. The oscillator frequency is measured by unit IFM which provides a binary digital output, representative of the frequency appearing at its input. The binary output is fed to one input of subtractor SUB and a binary number representative of the required frequency of the oscillator OSC is fed from reference store REF to a further input of subtractor SUB. The two input numbers are compared in subtractor SUB which subtracts one from the other to produce a difference signal of appropriate sign according to which of the inputs is the greater. The value of this difference signal thus represents the difference between the actual and the required frequency of oscillator VCO.

The difference signal is fed to the input of accumulating adder ACC which, on receipt of a clock pulse, adds this difference signal to the sum of all the preceding difference signals; providing, in effect, a digital integrator. The accumulated sum of the difference signals is stored in a digital store forming part of the accumulating adder ACC. This accumulated digital number is then changed into a proportionate analogue voltage by digital-to-analogue converter DAC and the resulting analogue voltage controls the frequency of oscillator VCO; the arrangement being such that any change in frequency of the oscillator due to a change in the control voltage is in such a direction as to reduce the difference signal between the actual and the required frequencies. In this manner, the frequency of the oscillator is made congruent with the required frequency stored in reference store REF.

Preferably, the binary numbers concerned are fed in parallel form since this simplifies the equipment and increases the system speed compared with serial feeding.

Frequency measuring units giving a digital output are well-known, the most common form of which ccomprises a digital counter which counts the incoming cycles of the frequency to be measured for a fixed time; the time chosen being dependent upon the accuracy required over the measurable frequency range. This general type of measuring unit is fairly slow in operation and is not suitable for use at upper radio frequencies. Preferably, the type of frequency measuring unit employed is that generally known as the "instantaneous measuring" type, an example of which is described in U.S. Pat. No. 953,430. A method for obtaining a digital output for this type of frequency measuring unit is described in U.S. Pat. No. 1,014,035. Such a unit is suitable for use at microwave frequencies. Some types of frequency measuring units have self-contained sampling switches and/or their outputs can be clocked — either by internal means or by the application of clock pulses thereto. Whichever type of unit is used, the circuit is arranged accordingly such that only one subtraction is effected by subtractor SUB for each frequency measurement.

Digital subtractors and digital-to-analogue converters are well-known per se and are commercially available in integrated circuit form.

As stated previously, accumulating adder ACC comprises a binary adder and a store, each of which is well-known in the art. Each difference value appearing at the output of subtractor SUB is added in accordance with its sign to the accumulated total of all previous difference values by the binary adder section. The new total is then clocked into the associated store by a clock pulse CP, which is delayed in time from the clock pulse for the sampling switch SW to allow for the time in frequency measurement, subtraction and accumulation.

Voltage-controlled oscillators are also well-known and, at least for radio frequencies, include a voltage-dependent capacitor, such as a varactor, in the tunable circuit.

Reference store REF merely stores, in digital form, the frequency at which the oscillator is to be controlled. If, for example, the oscillator is required to operate at one fixed frequency, store REF can be a permanent, hard wired, store. If the frequency is required to be variable, the store is preset to the value required, for example by keying or other indexing means. If the oscillator frequency is required to align itself with a reference pilot frequency, the reference frequency is measured by a frequency measuring unit and the digital output stored in the reference store. It will be shown, in the embodiment described later in relation to FIG. 2 of the accompanying drawings, that measuring unit IFM can be used for measuring both frequencies.

Accumulating adder ACC, as previously stated, acts in effect as a digital integrator whereby an averaged value of the required corrections is obtained for controlling the oscillator frequency. The degree of correction to the oscillator frequency for each unit (least significant digit) change in the difference signal must, of course, be determined and this is effected by the gain of the digital-analogue converter in conjunction with the voltage/frequency control characteristic of the oscillator. The system can only be as accurate as the reading accuracy of the frequency measuring unit, and, for optimum system accuracy, each unit change in the accumulating adder should cause a change in oscillator frequency which is equal to or slightly less than the minimum frequency change detectable by the frequency measuring unit. This can be explained by taking a practical example where the measuring unit IFM (referred to hereinafter as the IFM unit) can measure a frequency in the gigahertz range with an accuracy of 3 MHz (i.e., the digital output of the IFM unit is in 3 MHz steps). A unit change in the accumulating adder thus represents a 3 MHz change in the IFM unit. The change in oscillator frequency for a unit change in the accumulating adder total is dependent on various factors and can be adjusted. Let it be assumed that the change in oscillator frequency per unit change in the accumulating adder is $n$ times the frequency representing the unit change (i.e., 3 MHz), $n$ being a constant which is dependent on the gain and the control characteristic of the oscillator.

If $n = 1$, each unit change in the accumulating adder causes a 3 MHz change in the oscillator frequency. This is the ideal case.

If $n = 0.5$, each "frequency slot" in the IFM unit is still 3 MHz but each unit change in the accumulating adder now represents an oscillator frequency change of 1.5 MHz. If, for example, the oscillator frequency is four units, i.e., 12 MHz away from the reference frequency, the resulting change of four units in the accumulating adder only shifts the oscillator frequency by 6 MHz. In the next sample, the oscillator frequency is therefore 6 MHz, i.e., two units away from the reference frequency. The resulting change of two units in the accumulating adder changes the oscillator frequency 3 MHz; so the oscillator is locked on within 3 MHz.

If $n = 1.5$, each unit in the accumulating adder represents an oscillator frequency change of 4.5 MHz. If the oscillator is 12 MHz away from the reference, as before, the change of four units in the accumulating adder now shifts the oscillator frequency 18 MHz, i.e., the oscillator will now be 6 MHz on the other side of the reference frequency. In the next sample, the oscillator is therefore two units away from the reference frequency and these two units (now of opposite sign to the previous change) in the accumulating adder cause the oscillator frequency to change by 9 MHz and the oscillator is locked on within 3 MHz. The oscillator frequency, however, can only change in 4.5 MHz steps so, although in the foregoing example it locked on to within 3 MHz of the reference frequency, the system accuracy is 4.5 MHz.

From the foregoing examples it can be seen that if $0<n<1$, the oscillator will not cover the frequency range of the IFM unit because each frequency slot change of the latter causes a smaller frequency change in the oscillator. In this system, therefore, the bandwidth of the IFM unit needs to be greater than the operating bandwidth of the oscillator. If $1<n<2$, the system accuracy is reduced. Thus in an optimum system, $n = 1$, when the locking-on accuracy is equal to the digitalisation interval of the IFM unit. In practice, the control voltage/frequency characteristic slope of the oscillator may not be perfectly linear over the whole operating frequency range; so the value of $n$ may vary over the range. This only affects the system accuracy if $n$ exceeds unity; so in practice $n$ is made slightly less than unity and the IFM bandwidth is made slightly larger than the oscillator operating range.

An embodiment of the invention suitable for use with a reference frequency at microwave frequencies will now be described with reference to FIG. 2 of the accompanying drawings. In this figure, components corresponding with those of FIG. 1 are given the same reference.

A microwave reference frequency is applied at IP to a sampling switch SW1 controlled by control pulses at CP1, the output of SW1 being fed to one input port of a microwave directional coupler DC. The output frequency of oscillator VCO is fed via a further sampling switch SW2, controlled by pulses at CP2, to a further input port of directional coupler DC. Input signals appearing at either input port of coupler DC appear at one output port and are fed to the IFM unit the output of which now feeds the reference store REF as well as the binary subtractor SUB. The store REF is provided with a reset input R fed by clock pulses CP3. All control pulses are divided from a master oscillator MO. The operation of the circuit is as follows.

Control pulses CP1 and CP2 and 180° out of phase with the result that the oscillator output and the reference frequency input appear alternately at the input of the IFM unit which measures the frequency of each in turn and supplies the digital output to the store REF and subtractor SUB. Store REF stores each digital sample of the reference frequency input as it appears at the output of the IFM unit. Control pulses CP3 are coincident with control pulses CP1 so that the store is reset each time the reference frequency is sampled and then, after the small delay incurred by the IFM unit, stores the reference value. This same value is also fed to the subtractor SUB but, since there is no difference between the binary numbers appearing at the two inputs of the subtractor, no difference signal appears at its output.

A control pulse now appears at CP2 and the IFM unit digitises the oscillator frequency. Store REF still holds the reference value and, since it has not been reset, maintains this value. The subtractor SUB now produces a difference signal, and the rest of the system functions, in the manner previously described with reference to FIG. 1. Since the sampling is alternated between the reference signal and the oscillator frequency, the oscillator will follow any changes in the reference signal.

Sampling switches SW1 and SW2 may be so-called P.I.N. (p-intrinsic-n) diodes and microwaves directional couplers DC are well-known per se.

The master oscillator MO may conveniently be a multivibrator running at a frequency dependent on the tuning rate of the voltage-controlled oscillator across the operating frequency range of 2–4 GHz. For example, using a varactor tuned oscillator, the multivibrator frequency may be in the range 100 kHz to 1 MHz. Control pulses CP1 and CP2 may be obtained from the multivibrator output rectangular wave by differentiating the leading and trailing edges of the rectangular waves respectively (inverting one of the series of differentiated pulses accordingly) to provide two trains of pulses 180° out of phase.

Taking the example previously given of a system covering the range 2 – 4 GHz in 3 MHz steps, 667 steps are needed; so store REF, subtractor SUB and accumulating adder ACC must all be able to accommodate a nine-bit binary word (which caters for a maximum of 1,024 steps). Preferably, the binary word is fed in parallel form, in which case a practical system operating over the range 2 – 4 GHz can track to either edge of the band from the centre in a few microseconds.

What we claim is:

1. A circuit for automatically controlling the frequency of a voltage controlled oscillator in accordance with a reference signal comprising means coupled to receive said reference signal for measuring in binary form the frequency of said signal; reference store means coupled to said measuring means for storing a binary digital signal representative of the required frequency of said oscillator; means adapted to be coupled to said oscillator for obtaining in binary digital form the actual frequency of said oscillator; means coupled to said reference store means and said obtaining means for subtracting at periodic intervals the binary digital numbers therein to produce successive digital difference signals; digital accumulating means coupled to said subtracting means for successively adding said difference signals; and means coupled to said accumulating means and adapted to be coupled to said oscillator for converting said digital difference signals into an analogue voltage for controlling the frequency of said oscillator.

2. A circuit as claimed in claim 1 wherein said obtaining means comprises said measuring means.

3. A circuit as claimed in claim 1 wherein said accumulating means comprises a binary adder and a binary store coupled to said adder.

4. A circuit as claimed in claim 1 further comprising first and second switches, each of said switches comprising a first input adapted to be coupled to receive said reference signal and to said oscillator respectively, a control input, and an output; a source of switching signals having a pair of complementary outputs coupled to said control inputs respectively; and a directional coupler having an input coupled to said switch outputs, and an output coupled to said frequency measuring and said obtaining means.

5. A circuit as claimed in claim 4 wherein said switches each comprise a PIN diode.

* * * * *